(12) United States Patent
Ishigaki et al.

(10) Patent No.: US 9,979,700 B2
(45) Date of Patent: May 22, 2018

(54) SECURITY SYSTEM AND COMMUNICATION CONTROL METHOD

(71) Applicant: MITSUBISHI HITACHI POWER SYSTEMS, LTD., Kanagawa (JP)

(72) Inventors: Hiroyasu Ishigaki, Lake Mary, FL (US); Lisa Batsch-Smith, Lake Mary, FL (US)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 282 days.

(21) Appl. No.: 14/831,077

(22) Filed: Aug. 20, 2015

(65) Prior Publication Data

US 2017/0054687 A1 Feb. 23, 2017

(51) Int. Cl.
G06F 15/16 (2006.01)
H04L 29/06 (2006.01)

(52) U.S. Cl.
CPC ...... H04L 63/0281 (2013.01); H04L 63/0227 (2013.01)

(58) Field of Classification Search
CPC .............. H04L 63/0281; H04L 63/0227
See application file for complete search history.

(56) References Cited

U.S. PATENT DOCUMENTS

| | | | | |
|---|---|---|---|---|
| 7,320,027 B1 * | 1/2008 | Chang | ............... | H04L 29/12377 709/219 |
| 8,566,922 B2 * | 10/2013 | Hargis | ................. | G06F 21/554 370/338 |
| 2010/0257353 A1 | 10/2010 | Cheng | | |
| 2013/0152206 A1 | 6/2013 | Staubly | | |

(Continued)

FOREIGN PATENT DOCUMENTS

| | | |
|---|---|---|
| JP | 2000-354056 | 12/2000 |
| JP | 2001-325163 | 11/2001 |

(Continued)

OTHER PUBLICATIONS

International Search Report dated Nov. 8, 2016 in corresponding International Application No. PCT/JP2016/074219.

(Continued)

*Primary Examiner* — Mohammed Waliullah
(74) *Attorney, Agent, or Firm* — Wenderoth, Lind & Ponack, L.L.P.

(57) ABSTRACT

A security system comprising: a first gateway device; a second gateway device; and a duplex communication line, wherein a first proxy part of the first gateway device is configured, if an inbound data is of a specific protocol, to receive a communication information of the specific protocol transmitted by the inbound data and to send the communication information of the specific protocol to the second gateway device, and, if the inbound data is not of the specific protocol, not to send the inbound data to the second gateway device, and wherein the second proxy part is configured, when the second gateway device receives the communication information of the specific protocol from the first proxy part, to acquire a destination address for communication in an internal network from the communication information of the specific protocol and to send the communication information of the specific protocol to the destination address.

18 Claims, 6 Drawing Sheets

(56) References Cited

U.S. PATENT DOCUMENTS

2013/0339509 A1* 12/2013 Johnson .................. H04L 41/14
709/223
2014/0006788 A1* 1/2014 Ignatchenko ....... H04L 63/0428
713/175
2015/0113172 A1* 4/2015 Johnson .................. H04L 67/34
709/245

FOREIGN PATENT DOCUMENTS

| JP | 2006-99590 | 4/2006 |
|---|---|---|
| JP | 2011-151606 | 8/2011 |
| JP | 2012-523170 | 9/2012 |
| JP | 2013-201589 | 10/2013 |
| JP | 2014-140096 | 7/2014 |

OTHER PUBLICATIONS

Tadashi Yamamoto et al., Secure Gateway, vol. 71, No. 4, pp. 58-61, Oct. 2004, Oki technical review (with machine translation).
English translation of the Written Opinion of the International Searching Authority dated Jan. 5, 2018 in corresponding International Application No. PCT/JP2016/074219.

* cited by examiner

SECURITY SYSTEM AND COMMUNICATION CONTROL METHOD

TECHNICAL FIELD

This disclosure relates to a security system and a communication control method for connecting an internal network and an external network to each other and for protecting the internal network.

BACKGROUND

Currently, important infrastructures (such as power generation, chemicals, water, petroleum and gas) are connected to the Internet to enable remote monitoring or remote operation via the Internet. Thus, services such as remote monitoring and remote operation of a control network can be provided relatively easily and inexpensively by means of IP communications as a platform. In order to enhance such service business, it is important or almost necessary to connect the control network to the Internet or a cloud computing system. On the other hand, requirement for cybersecurity of such important infrastructures (industrial resources) has been increased. For example, in North America, the NERC CIP (North American Electric Reliability Corporation critical infrastructure protection) requirement is provided, where a security standard required when important infrastructures are operated is defined. Thus, it is necessary to develop an infrastructure or system to fulfill both demands of providing services via the Internet and securing the control network from cyberattacks, at a low cost.

As technique for protecting an internal network such as the control network from cyberattacks, firewalls are widely known (Patent Documents 1 and 2). A firewall is provided at the border between an internal network to be protected and an internal network such as the Internet, to protect the internal network from cyberattacks. For instance, in the technique disclosed in Patent Document 1, a local network (internal network) and the Internet are connected through a firewall, and communications from the Internet side to the local network side are absolutely refused. On the other hand, at the time of communication from agents on the local network to consoles on a second local network connected via the Internet, the port of the firewall is dynamically opened to allow the communication. In this way, communication between the internal network and the external network is enabled while the internal network is protected from attacks from outside.

In the technique disclosed in Patent Document 2, routers are provided between the Internet and a public subnet and between the public subnet and a private internal subnet, respectively, and packets passing through the routers are filtered by the routers. For example, the router installed between the public subnet and the private internal subnet provides IEEE 1394 connection between computers on the public subnet and computers on the private internal subnet. The router performs filtering of packets based on the source ID of IEEE 1394 or on whether the packet is necessary for remote operation based on frame buffer transfer between a computer on the public subnet and a computer on the private internal subnet. The computer on the private internal subnet receives a data through polling of computers on the public subnet by means of read transaction at a constant time interval, and sends data by means of write transaction. With such a configuration, even if a large amount of improper data is sent by a computer on the public subnet, it is possible, by checking the amount of data transfer, to detect abnormal transferring and thereby to prevent its immediate influence on the computers on the private internal subnet, according to Patent Document 2.

On the other hand, for the purpose of security measures, a device called data diode, by which data is allowed to flow only one way in a communication path of a gateway, is known. It is said that by using the data diode, it is possible to completely prevent data flow in the direction opposite to the allowed direction, thereby to provide protection from cyberattacks such as virus attacks and hacking from outside. For example, in the technique disclosed in Patent Document 3, computers are connected through such data diodes and also through general communication paths. And, confirmation of delivery of the data sent through the data diodes is performed by using the general communication paths, whereby security measures using data diodes are realized while reliability of data transmission is secured.

CITATION LIST

Patent Literature

Patent Document 1: JP 2001-325163 A
Patent Document 2: JP 2000-354056 A
Patent Document 3: JP 2014-140096 A

SUMMARY

Technical Problem

According to Patent Document 1 or 3, end devices are connected by means of general technique based on TCP/UDP/IP communication. Thus, in case where there is any vulnerability of operating systems or communication devices, it is logically difficult to perfectly avoid influence on the control network.

According to Patent Document 2, the computers on the private internal subnet and the computers on the public subnet are connected via IEEE 1394 connection, whereby the communication between an external computer at the Internet side and a computer on the private internal subnet is terminated by the computer on the public subnet.

In view of the above circumstances, at least one embodiment of the present invention is to provide a security system and a communication control method enabling duplex communication between an internal network such as a control network and an external network while protecting the internal network from cyberattacks.

Solution to Problem (1) A security system according to at least an embodiment comprises:
  a first gateway device configured to be connected to an external network;
  a second gateway device configured to be connected to an internal network and to the first gateway device; and
  a duplex communication line for connecting the first gateway device and the second gateway device so as to enable two-way communication between the first gateway device and the second gateway device,
  wherein the first gateway device has a first proxy part configured to process a specific protocol of an application layer,
  wherein the second gateway device has a second proxy part configured to process the specific protocol, wherein the first proxy part is configured, when the first gateway device receives an inbound data from the external network to the internal network, to receive a communication information of the specific protocol conveyed by the inbound data and to send the communication information of the specific protocol to the second gateway device through the duplex communication line if the inbound data is of the specific protocol, and not to send the inbound data to the second gateway device if the inbound data is not of the specific protocol, and wherein the second proxy part is configured, when the second gateway device receives the communication information of the specific protocol from the first proxy part through the duplex communication line, to acquire a destination address for communication in the internal network from the communication information of the specific protocol and to send the communication information of the specific protocol to the destination address.

With the above configuration (1), if the inbound communication from the external network to the internal network is a communication for communication information of the specific protocol, the inbound communication is sent (re-layed) from the first gateway device to the second gateway device. In this case, the first gateway device receives the communication information of the specific protocol delivered by the inbound data by the first proxy part, and sends (relays) it to the second gateway device. That is, the communication information of the specific protocol is a communication data generated by a sending-side end device to exchange a message (e.g. a control command) with a receiving-side end device. And, the first gateway device terminates the network layer protocol (e.g. IP) of the external network, and then sends the received communication information to the internal network. By logically separating the receiving-side end device on the internal network from the sending-side end device on the external network and limiting the communication means which is able to relay such logically separated networks to the first proxy part and the second proxy part which are able to process the specific protocol, communication other than that of the specific protocol cannot enter the internal network. Thus it is possible to block improper access from the external network to the internal network such as attacks and hacking, thereby to protect the internal network.

Further, the second proxy part of the second gateway device acquires the destination address (e.g. destination IP address) of the receiving-side end device on the internal network on the basis of the communication information of the specific protocol received from the first gateway device, and sends the communication information of the specific protocol to the receiving-side end device. It is thereby possible to surely protect the internal network by the second gateway device. As described above, the internal network is protected by the two-stage security system including the first gateway device and the second gateway device, and it is possible to surely protect the internal network by the security system. The communication control by the first gateway device (the first proxy part) and the second gateway device (the second proxy part) has no influence on communication processing (e.g. using IP packets or employing a specific communication interface) by the sending-side end device and the receiving-side end device, whereby it is possible to build a communication path which is secure and of high degree of freedom.

(2) In some embodiments, in the above configuration (1), the security system further comprises a simplex communication line for connecting the first gateway device and the second gateway device so as to enable one-way communication from the second gateway device to the first gateway device, wherein when the second gateway device receives an outbound data from the internal network to the external network, the outbound data is sent to the first gateway device through the simplex communication line and not through the duplex communication line.

According to the above configuration (2), the outbound communication necessarily goes through the simplex communication line. It is thereby possible to send e.g. information of operation of a plant to the receiving-side end device (destination address) on the external network from the sending-side end device on the internal network while surely blocking attacks or hacking from the external network, like data diodes.

(3) In some embodiments, in the above configuration (2), the simplex communication line includes an optical fiber cable for connecting a physical sending port of the second gateway device and a physical receiving port of the first gateway device.

According to the above configuration (3), it is possible to easily build the simplex communication line from the second gateway device to the first gateway device. Further, since communication is made via the optical fiber cable, it is possible to communicate a large amount of data at a high speed. For example, in the case where the internal network is a control network, operating information of e.g. plants is to be sent to outside of the internal network; in such a case, it is possible to perform high-speed communication.

(4) In some embodiments, in any of the above configurations (1) to (3), the security system is configured so that on the duplex communication line, communication by means of a non-routable protocol is performed.

According to the above configuration (4), the first gateway device and the second gateway device are connected by means of the non-routable protocol such as serial communication. That is, the inbound communication from the external network is once converted into serial communication. Thus, in the case where the internal network and the external network are IP networks, for example, the inbound communication from the external network is not routed to the internal network through the security system 1, and it is possible to establish a secure communication path.

(5) In some embodiments, in any of the above configurations (1) to (4), each of the external network and the internal network includes IP network.

According to the above configuration (5), each of the internal network and the external network is constituted by IP network, and the IP networks are logically separated by the first gateway device and the second gateway device. Thus, except for communication based on the specific protocol, IP communication from the external network e.g. the Internet is blocked out of the internal network, and it is thereby possible to protect the internal network from cyber-attacks from e.g. the Internet based on IP.

(6) In some embodiments, in the above configuration (5), the first gateway device is configured to identify the communication information of the specific protocol by a port number.

According to the above configuration (6), it is possible to easily identify the communication based on the specific protocol by using the port number of e.g. UDP or TCP.

(7) In some embodiments, in the above configuration (6), the second gateway device is configured to send the outbound data to the first gateway device by using the simplex communication line when the outbound data received from the internal network is of a UDP/IP communication.

According to the above configuration (7), by using UDP/IP, which is a connectionless-type communication, it is possible to send data without transmittal confirmation from the destination device on the external network. Thus, it is possible to easily perform one-way communication using the on-way communication line from the source device on the internal network to the destination device on the external network.

(8) In some embodiments, in any of the above configurations (1) to (7), the specific protocol is a unique protocol which is not standardized.

According to the above configuration (8), only the first gateway device and the second gateway device which can interpret the specific protocol which is a unique protocol are configured to relay the unique protocol-based (the specific protocol-based) data received from the external network to the destination on the internal network. Thus, data based on an standardized application layer protocol cannot be transmitted from the external network to the internal network, whereby it is possible to increase protection against cyber-attacks.

(9) In some embodiments, in any of the above configurations (1) to (8), the duplex communication line includes a serial communication including RS-232C.

According to the above configuration (9), it is possible to send and receive the communication information of the specific protocol between the first gateway device and the second gateway device can be performed by a simple means employing a standard interface. Further, in the case of the internal network is a control network, the amount of communication data such as control request for the control network transmitted from a remote PC (a sending-side end device) connected to the external network is small, and thus it is possible to provide an adequate speed for such communication.

(10) In some embodiments, in any of the above configurations (1) to (9), the first gateway device is connected to the external network through a first firewall, and the second gateway device is connected to the internal network through a second firewall.

According to the above configuration (10), by means of the first firewall and the second firewall, it is possible to block cyberattacks from the external network to the internal network while allowing certain communication which is preliminary defined, thereby to protect the internal network more surely. Further, it is possible to reduce processing load of the first gateway device and the second gateway device.

(11) A communication control method according to at least an embodiment of the present invention, which can be executed by a security system including: a first gateway device configured to be connected to an external network; a second gateway device configured to be connected to an internal network and to the first gateway device; and a duplex communication line for connecting the first gateway device and the second gateway to each other, comprises:

an inbound data receiving step of receiving an inbound data from the external network to the internal network by the first gateway device;

a first inbound communication processing step of, by means of the first gateway device, checking an application layer protocol of the inbound data, and sending the inbound data to the second gateway device by using the duplex communication line if the application layer protocol is a specific protocol, and not sending the inbound data to the second gateway device if the application layer protocol is not the specific protocol; and a second inbound communication processing step of, if the inbound data received from the first gateway device includes a communication information of the specific protocol, by means of the second gateway device, acquiring a destination address for communication in the internal network on the basis of information of the specific protocol and sending the inbound data to the destination address.

According to the above method (11), the same effect as described in above (1) can be provided.

(12) In some embodiments, in the above method (11), the security system further includes a simplex communication line for connecting the first gateway device and the second gateway device so as to enable one-way communication from the second gateway device to the first gateway device, and the communication control method further comprises an outbound communication processing step of, when the second gateway device receives an outbound data from the internal network to the external network, sending the outbound data to the first gateway device through the simplex communication line and not through the duplex communication line.

According to the above method (12), the same effect as described in above (2) can be provided.

(13) In some embodiments, in the above method (12), the simplex communication line includes an optical fiber cable for connecting a physical sending port of the second gateway device and a physical receiving port of the first gateway device.

According to the above method (13), the same effect as described in above (3) can be provided.

(14) In some embodiments, in any of the above methods (11) to (13), in the duplex communication line, communication by means of a non-routable protocol is performed.

According to the above method (14), the same effect as described in above (4) can be provided.

(15) In some embodiments, in any of the above methods (11) to (14), each of the external network and the internal network includes IP network.

According to the above method (15), the same effect as described in above (5) can be provided.

(16) In some embodiments, in the above method (15), the first gateway device is configured to identify the communication information of the specific protocol by a port number.

According to the above method (16), the same effect as described in above (6) can be provided.

(17) In some embodiments, in the above method (16), the outbound communication processing step includes an outbound communication filtering step of permitting sending of the outbound data through the simplex communication line when the outbound data received from the internal network is of a UDP/IP communication.

According to the above method (17), the same effect as described in above (7) can be provided.

(18) In some embodiments, in any of the above methods (11) to (17), the specific protocol is a unique protocol which is not standardized.

According to the above method (18), the same effect as described in above (8) can be provided.

(19) In some embodiments, in any of the above methods (11) to (18), the duplex communication line includes a serial communication including RS-232C.

According to the above method (19), the same effect as described in above (9) can be provided.

(20) In some embodiments, in any of the above methods (11) to (19), the first gateway device is connected to the external network through a first firewall, and the second gateway device is connected to the internal network through a second firewall.

According to the above method (20), the same effect as described in above (10) can be provided.

Advantageous Effects

According to at least an embodiment of the present invention, a security system or a communication control method enabling two-way communication between an internal network such as a control network and an external network while protecting the internal network from cyberattacks is provided.

DETAILED DESCRIPTION

Embodiments of the present invention will now be described in detail with reference to the accompanying drawings. It is intended, however, that an expression such as "comprise", "include", "have", "contain" and "constitute" are not intended to be exclusive of other components.

Figure 1:
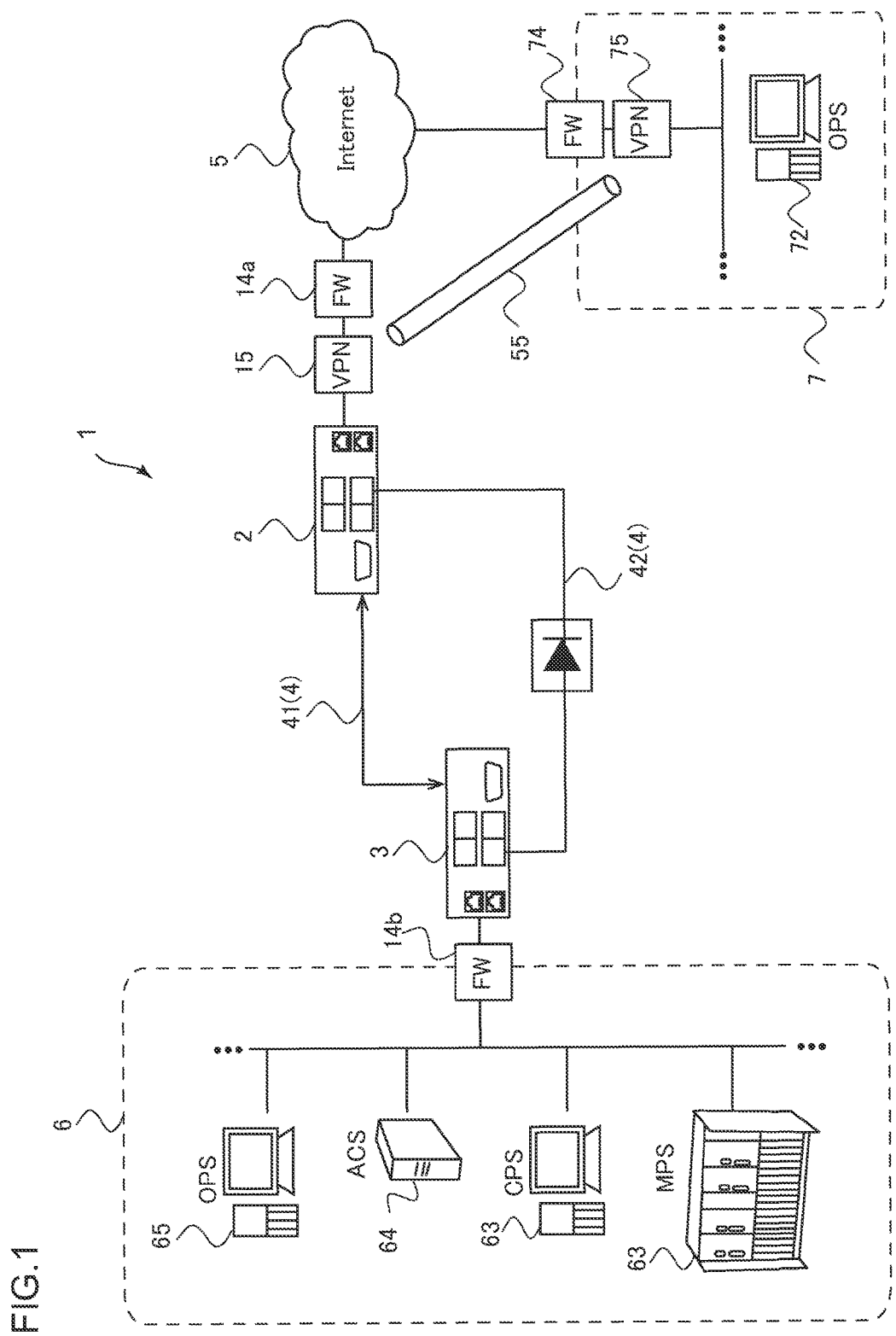
FIG. 1 is a diagram illustrating a configuration of the whole network including a security system according to an embodiment of the present invention.
Figure 2:
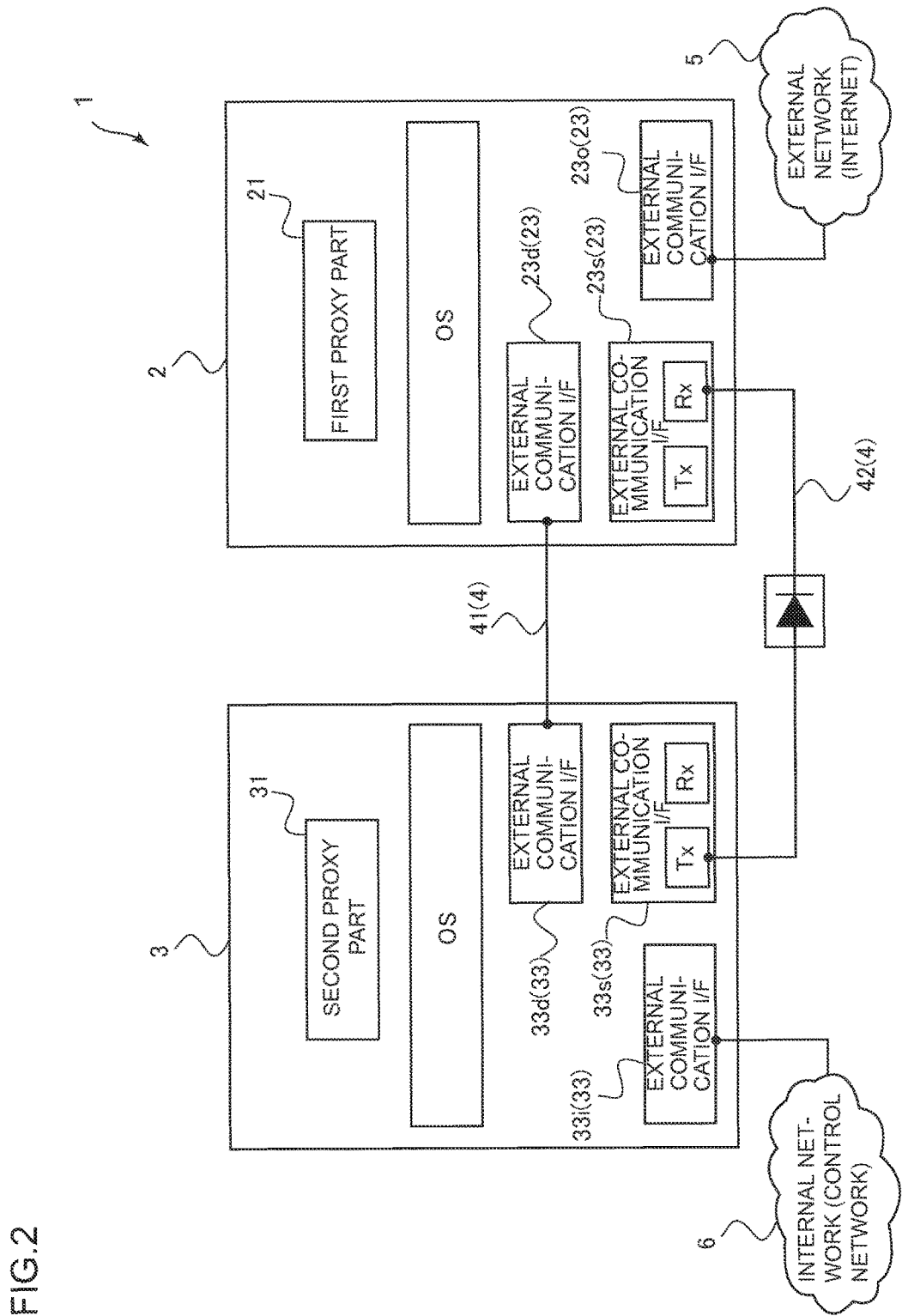
FIG. 2 is a diagram illustrating a configuration of a security system according to an embodiment of the present invention.

FIG. 1 is a diagram illustrating a configuration of the whole network including a security system 1 according to an embodiment of the present invention. FIG. 2 is a diagram illustrating a configuration of a security system 1 according to an embodiment of the present invention. Security system 1 enables end-to-end (E2E) communication between a communication device on an internal network and a communication device on an external network while protecting the internal network from e.g. cyberattacks via the external network. As described later, the internal network may, for example, be a control network 6 of a power generating plant, and the external network may, for example, be the Internet 5, and services such as remote monitoring and remote operation of a communication device on the internal network via the external network are provided. At the entry (border) of the internal network, the security system 1 allows communications required e.g. for the above services and blocks improper or unauthorized communications such as cyberattacks.

In order to perform such communication control, the security system 1, as illustrated in FIG. 1 and FIG. 2, comprises a first gateway device 2 and a second gateway device 3 for connecting different networks to each other, and a duplex communication line 41 and a simplex communication line 42 for connecting the first gateway device 2 and the second gateway device 3 to each other. The first gateway device 2 is configured to be connected to an external network, and the second gateway device 3 is configured to be connected to the internal network to be protected. As described above, the internal network is a network to be protected by the security system 1, and the external network is a network other than the internal network, which exists outside an internal network connected to the internal network to be protected. In the embodiment as illustrated in FIG. 1 and FIG. 2 is a control network 6 which will be described later, and the external network is the Internet 5 or a teleport network 7 which will be described later.

The control network 6 shown in FIG. 1 and FIG. 2 is an Ethernet-based local area network (LAN). Further, the control network 6 is a control network of a power generating plant, and to the control network 6, as shown in the drawings, a process station (MPS) as a controller to control the plant, a control device 63 such as a CPU module (CPS) as a local controller to perform processing for input-output to and from a device for controlling field manufacturing equipment or to perform various processing, an accessory station (ACS) 64 as a terminal having a role of collecting data from e.g. the control device 63 or a role as an interface to the outside, an operator station (OPS) 65 as a machine for monitoring and operating e.g. the control device 63, or the like are connected. These devices/machines (control device 63, ACS 64, OPS 65, etc.) and the second gateway device 3 respectively have private IP addresses assigned which are different to one another, and they are allowed to establish IP communications on the LAN.

The teleport network 7 shown in FIG. 1 and FIG. 2 is a network connected to the Internet 5 via a firewall 74, and it constitutes a part of the external network together with the Internet 5. Further, the teleport network 7 is an intranet to which an operator station (OPS) 72 as a machine for monitoring or operating the control device 63, a server for remote monitoring, various devices (hereinafter referred to also as "remote PC(s)") such as tablet terminals, or the like are connected. The teleport network 7 is also an Ethernet-based local area network (LAN), and the devices/machines (remote PC, etc.) which are connected to the teleport network 7 have private IP addresses assigned which are different to one another, whereby they are allowed to establish IP communications on the LAN.

In the embodiment as illustrated in FIG. 1 and FIG. 2, the control network 6 (internal network) and the teleport network 7 are connected to each other via a VPN (Virtual Private Network) built across the Internet 5. More specifically, the VPN is built between a VPN device 75 (e.g. a VPN router) provided opposite to the Internet 5 across the firewall 74 of the teleport network 7 and a VPN device 15 provided opposite to the Internet 5 across a first firewall 14a provided at the border between the first gateway device 2 and the Internet 5, and a virtual tunnel (VPN tunnel 55) is built across the Internet 5.

Between the control device 63 of the control network 6 and the remote PC, E2E communication is established via the above VPN connection and the connection between the first gateway device 2 and the second gateway device 3, which will be described later. That is, by using, as the remote PCs, various devices such as the OPS 72, remote monitoring or remote control of e.g. the control device 63 connected to the control network 6 are performed. The connection between the first gateway device 2 and the second gateway device 3 is established by means of communication lines 4 including a duplex communication line 41 and a simplex communication line 42, respectively.

As shown in FIG. 1 and FIG. 2, the duplex communication line 41 is a communication line 4 connecting the first gateway device 2 and the second gateway device 3 so as to enable two-way communication therebetween. In the embodiment illustrated in FIG. 1 and FIG. 2, the duplex communication line 41 is a communication line 4 through which serial communication such as RS-232C is performed, and the first gateway device 2 and the second gateway device 3 are connected to each other through the duplex communication line 41 on a one-to-one basis. That is, the destination of a communication through the duplex communication line 41 is the counterpart device which is directly connected, and communication data to be sent from the first gateway device 2 via the duplex communication line 41 will not be automatically transmitted to devices other than the second gateway device 3. Likewise, communication data to be sent from the second gateway device 3 via the duplex communication line 41 will not be automatically transmitted to devices other than the first gateway device 2. As described, the communication through the duplex communication line 41 is performed with a protocol which is not routed (a non-routable protocol). In FIG. 2, an external communication interface (external communication IF) 23*d* of the first gateway device 2 and an external communication IF 33*d* are connected by a RS-232C cable.

The duplex communication line 41 is a line mainly for sending control commands (communication information of the specific protocol which will be described later) from the remote PC (OPS 72) to the control device 63 of the control network or the like. The amount of communication of such control commands is relatively small, and with the communication line 4 of a relatively low speed such as RS-232C, it is possible to provide adequate communication speed while limiting the communication volume. As described later, communication through the duplex communication line 41 is controlled by a first proxy part 21 of the first gateway device 2 and a second proxy part 31 of the second gateway device 3, to protect the control network 6 (internal network).

On the other hand, as shown in FIG. 1 and FIG. 2, the simplex communication line 42 is a communication line 4 for connecting the first gateway device 2 and the second gateway device 3 so as to enable one-way communication from the second gateway device 3 to the first gateway device 2. The simplex communication line 42 may perform one-way communication by connecting a physical sending port of an external communication IF 33*s* (e.g. a NIC: Network Interface Card) of the second gateway device 3 and a physical receiving port of an external communication IF 23*s* of the first gateway device 2 and not connecting a physical sending port of the external communication IF 23*s* of the first gateway device 2 and a physical receiving port of the external communication IF 33*s* of the second gateway device 3. More specifically, in the embodiment illustrated in FIG. 1 and FIG. 2, as shown in FIG. 2, the simplex communication line 42 is formed by connecting the physical sending port (Tx port) of the external communication IF 33*d* of the second gateway device 3 and the physical receiving port (Rx port) of the external communication IF 23*d* of the first gateway device 2 with an optical cable and not connecting the physical sending port (Tx port) of the external communication IF 23*d* of the first gateway device 2 and the physical receiving port (Rx port) of the external communication IF 33*d* of the second gateway device 3 with e.g. an optical fiber cable. The communication line 4 for one-way communication is configured by physically forming the simplex communication line 4.

The simplex communication line 42 is a communication line 4 mainly for sending a large amount of data such as operating data of the plant from the inside of the control network 6 to the outside remote PC such as OPS 72 or various servers, and it is configured by using the optical fiber cable, whereby a high-speed communication can be provided. In this way, the security system 1 is configured so that communication from the external network cannot reach the control network 6 through the simplex communication line 42 to protect the control network 6 (internal network).

In the above-described whole network configuration, the first gateway device 2 and the second gateway device 3 are configured to control communication via the communication lines 4 (the duplex communication line 41 and the simplex communication line 42) connecting both the devices thereby to protect the internal network. More specifically, as illustrated in FIG. 2, the first gateway device 2 has a first proxy part 21 configured to process a specific protocol which is a specific application layer protocol, and the second gateway device 3 has a second proxy part 31 configured to process the specific protocol. The first proxy part 21 and the second proxy part 31 perform sending processing and receiving processing (sending and receiving processing), which will be described later, for communication data via the duplex communication line 41 or the simplex communication line 42 to carry out communication control of the communication which tries to go through the devices, as will be described later.

The specific protocol is a protocol for exchanging information between communication devices (e.g. the control device 63 or ACS 64) on the control network 6 and communication devices (e.g. the remote PC) on the external network, and an information communication of the specific protocol is exchanged. That is, the communication information of the specific protocol is an E2E communication data (e.g. a control command having a message format or a monitoring data demand) to be exchanged between a receiving-side end device such as the control device 63 and a sending-side end device such as the remote PC, and the communication information is generated by the send-side end device. That is, the remote PC (e.g. OPS 72) and the control device 63 or ACS 64 on the control network 6 have installed a dedicated application (i.e. dedicated program) to execute processing (e.g. generation, interpretation or execution of a control command) of the communication information of the above specific protocol. Processes of the dedicated application run on OS (Operating System) on the respective devices/machines, and inter-process communication based on the specific protocol between the devices/machines are performed to carry out control depending on the content of the communication information of the specific protocol.

The communication information of the specific protocol has the format of the specific protocol. For example, the communication information may have a header section (control section) and a data section. The format may contain an destination address information to identify the receiving-side end device (i.e. destination), and the information may be used at least by the second proxy part 31, as will be described later. Then, a socket API is called by the dedicated program running on the sending-side end device, whereby a UDP/IP packet containing the communication information of the specific protocol is generated and sent to the network. At this time, the communication information of the specific protocol may be compressed and encrypted by the dedicated program. Such communication data may be made into an IP packet, whereby it is possible to improve the resistance against taping or falsification of the data. Further, communication sent from the dedicated program running on the sending-side end device may be monitored by the dedicated program running on the receiving-side end device, whereby messages can be exchanged through decompression and decryption of the communication data. The dedicated programs may generate TCP/IP packets to perform communication.

In the embodiment as illustrated in FIG. 1 and FIG. 2, the specific protocol is a unique protocol which is not standardized and of which specifications is not opened to the public. That is, only the first gateway device 2 and the second gateway device 3 which can interpret the unique specific protocol are configured to be able to send (relay) transmittal data of the unique protocol (specific protocol) received from the external network to the destination on the internal network. Thus, the transmittal data of a standardized application layer protocol from the external network to the internal network, whereby it is possible to improve defensive property against cyberattacks.

The first proxy part 21 and the second proxy part 31 (proxy parts) process communication information of such a specific protocol (unique protocol). The proxy parts (the first proxy part 21 and the second proxy part 31) are, as shown in FIG. 2, processes or threads of the application software running on the OS as the platforms of the first gateway device 2 and the second gateway device 3. That is, the first gateway device 2 and the second gateway device 3 are each provided with a processor (CPU) and a memory. The program (software) functioning as the proxy part are loaded and runs, utilizing functions of the platform such as OS. More specifically, the proxy part is configured to execute an instruction of the program by means of the processor to process the specific protocol. Further, the proxy part is configured to execute an instruction of the program by means of the processor to perform communication to and/or from the outside of the device, utilizing communication functions (e.g. the OS or the external communication IF) of the platform. The proxy parts may run on a platform of various types such as DOS, UNIX, LINUX or Windows.

When the transmittal data reach the external communication IF (23, 33) of the gateway device (the first gateway device 2 or the second gateway device 3), the first gateway device 2 or the second gateway device 3 receives the transmittal data. Further, in the gateway device, the proxy part (the first proxy part 21 or the second proxy part 31) monitors receipt of the communication data to be process, and the received transmittal data is received by the proxy part through processing by the communication processing part (e.g. the OS or the external communication IF (23, 33)) of the platform of the gateway device. In this regard, the proxy part may be configured to receive only the communication information of the specific protocol which is to be processed. Alternatively, the proxy part may be configured to receive communication data of all of the transmittal data received by the gateway device and to identify the communication information of the specific protocol, and to continuously perform sending and receiving processing (which will be described later) of object data to be processed, and to end the processing of communication data (e.g. to discard the communication data) other than the object data.

Determination as to whether the communication data is the communication information of the specific protocol may be carried out based on the port number (UDP port number or TCP port number) contained in the IP packet. In the embodiment as illustrated in FIG. 1 and FIG. 2, the determination is performed based on the port number. By such a configuration, it is possible to easily identify the communication based on the specific protocol by the port number. In this way, the proxy part acquires the communication information of the specific protocol. In the case where the communication information of the specific protocol is divided into a plurality of packets to be transmitted on the network (the internal network or the external network), the proxy part can acquire the communication information by receiving all of the IP packets and combining them to reconstruct the information.

Now, the communication control (sending and receiving processing) by the first gateway device 2 and the second gateway device 3, which contains inbound communication and outbound communication, will be described with reference to FIG. 3 and FIG. 4, in order. These figures, which are corresponding to FIG. 1 and FIG. 2, describe the cases where end-to-end (E2E) communication between a remote PC (e.g. the OPS 72 or a server) and the control device 63 (see FIG. 3) or the ACS 64 (see FIG. 4) is performed. The inbound communication is a communication from the external network to the internal network. The outbound communication is a communication from the internal network to the external network. In the embodiment to be described, the respective end devices are able to recognize the destination address (IP address) on the network of the destination end device at the time of communication and to set the destination IP address for the IP communication to the destination address.

Figure 3:
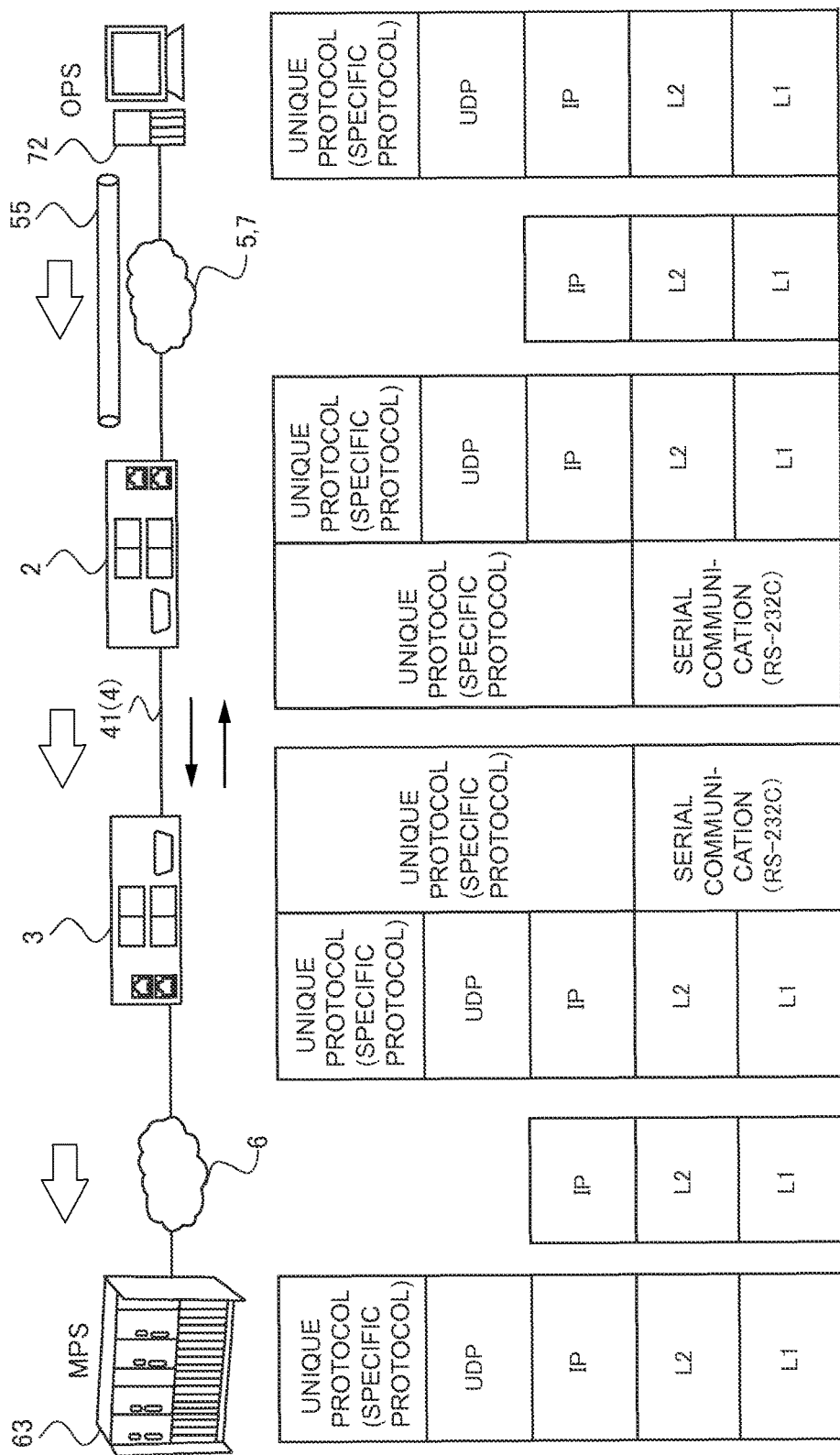
FIG. 3 is a diagram illustrating a protocol stack of inbound communication transmitted through a network according to an embodiment of the present invention.

As shown in FIG. 3, the inbound communication corresponds to a data communication where the communication device on the external network has a role as the source (sending-side end device) and the communication device on the internal network has a role as the destination (receiving-side end device). The first proxy part 21 is configured, when the first gateway device 2 receives an inbound data from the external network to the internal network, to receive a communication information of the specific protocol transmitted by the inbound data and to send the communication information of the specific protocol to the second gateway device through the duplex communication line if the inbound data is of the specific protocol. Further, the first proxy part 21 is configured not to send the inbound data to the second gateway device if the inbound data received by the first gateway device 2 is not of the specific protocol.

More specifically, FIG. 3 is a diagram illustrating a protocol stack of inbound data transmitted through a network according to an embodiment of the present invention. In FIG. 3, IP packets having communication information of the specific protocol (unique protocol) set in the data section is sent from the remote PC (OPS 72 in FIG. 3). In the embodiment shown in FIG. 3, an IP packet from the remote PC is transmitted through the teleport network 7 by means of Ethernet frame, goes through the VPN tunnel 55 on the Internet 5 to reach the first gateway device 2, and then is received by the first gateway device 2 via the external communication IF 23o.

The first proxy part 21 performs receiving processing when it receives communication information of the specific protocol. The receiving processing by the first proxy part 21 may include acquiring the destination address (address of the receiving-side end device) of the received communication information of the specific protocol. On the basis of the received destination address, the communication can be recognized as being to be delivered not to itself but to the receiving-side end device on the control network 6 beyond the duplex communication line 41. The destination address may be acquired by various methods, as will be described later. Further, the second proxy part 31 acquires the destination address of the receiving-side end device from the communication information of the specific protocol received from the first proxy part 21 in the same manner, as will be described later.

For instance, in some embodiments, the first proxy part 21 acquires the destination address from the communication information of the specific protocol without using the destination address (destination IP address of the IP packet) of the transmittal data sent by the remote PC (OPS 72). That is, the communication information of the specific protocol has a destination address field for storing the destination address, and the destination address of the receiving-side end device is preliminarily set on the remote PC side. The first proxy part 21 searches the destination address field to acquire the destination address. For example, the destination IP address itself may be stored in the destination address field; or address information (e.g. URL) may be stored in the destination address field and the destination IP address may be acquired by using a DNS (Domain Name System) provided inside or outside of the gateway device. The destination address field may be at a fixed position in the format of the communication information of the specific protocol or at any position by means of e.g. tag information. By such configuration, it is difficult for the first proxy part 21 to recognize the destination from the communication information of a protocol other than the specific protocol, and it is possible to prevent communication other than inbound communication in line with the specification of the specific protocol from going through the first gateway device 2.

In some embodiments, when receiving the communication information of the specific protocol from the OS, at the same time the first proxy part 21 receives and acquires the destination address (destination IP address of the IP packet) of the transmittal data sent by the remote PC (OPS 72). In this case, the information of the destination address may not be contained in the communication information of the specific protocol just-generated by the remote PC. Further, in this case, the sending processing by the first proxy part 21 is such that the first proxy part 21 sends the acquired destination address together with the communication information of the specific protocol to the second proxy part 31 via the duplex communication line 41. The destination address may be added to the communication information of the specific address by a method arranged between the first proxy part 21 and the second proxy part 31. For example, the destination address may be added to e.g. the destination address field of the communication information of the specific protocol. By the above configuration, it is possible to prevent communication other than inbound communication in line with the specification of the specific protocol from going through the first gateway device 2.

In any of the above embodiments, the receiving processing may include decompressing or decrypting the communication information of the specific protocol compressed or encrypted by the remote PC. In this case, the first proxy part 21 may perform sending to the second proxy part 31 only when it acquires correct communication information of the specific protocol by decompression or decryption.

The first proxy part 21 performs sending processing of the communication information of the specific protocol after the receiving processing as described above. More specifically, as shown in FIG. 3, the first proxy part 21 sends the communication information to the second gateway device 3 by serial communication (one-to-one connection) via the duplex communication line 41. More specifically, the first proxy part 21 recognizes existence of the receiving-side end device on the control network 6 on the basis of the acquired destination address and sends the communication information of the specific protocol via the duplex communication line 41. The sending processing may include compression or encryption of the communication information of the specific protocol. In the exemplary embodiment shown in FIG. 1 to FIG. 3, the first proxy part 21 of the first gateway device 2 sends communication data via a RS-232C serial port (COM port) in a serial manner. The second proxy part 31 of the second gateway device 3 receives the communication data via a RS-232C serial port (COM port) in a serial manner and carries out sending and receiving processing which will be described later.

The sending and receiving processing by the first proxy part 21 is not limited to the above example. In some embodiments, the first proxy part 21 may be configured on the assumption that the receiving-side end device is on the control network 6 beyond the duplex communication line 41. That is, the first proxy part 21 may be such that it does not acquire the destination address by the receiving processing and it performs sending processing on the assumption that the received communication information of the specific protocol is always delivered to the control network. In this case, it is necessary for the communication information of the specific protocol just-generated by the remote PC to contain information of the destination address. By such configuration, it is possible to limit the communication data which may go through the first gateway device to the communication information of the specific protocol and to prevent the other communication data from entering the internal network.

On the other hand, when the second proxy part 31 receives communication data sent from the first proxy part 21 as described above, the second proxy part 31 performs receiving processing. Specifically, the second proxy part 31 is configured such that when the second proxy part 31 receives the communication information of the specific protocol from the first proxy part 21, the second proxy part 31 acquires the destination address of the communication on the internal network from the communication information of the specific protocol and sends the communication information of the specific protocol to the destination address. That is, the first proxy part 21 and the second proxy part 31 are connected on a one-to-one basis, and in such communication, information representing a destination address of several hops ahead, which an IP packet has, is not needed and is not usually used. In other words, IP communication from the external network is once terminated by the first gateway device 2, and the second proxy part 31 cannot usually acquire the destination address of the receiving-side end device merely by replacing IP communication with serial communication such as RS-232C because the destination IP address for a terminated IP communication is not necessary. Therefore, the second proxy part 31 acquires address information from the communication information sent by the first proxy part 21. For example, as described above, it may be such that the communication information of the specific protocol has a destination address field for storing the destination address, and the second proxy part 31 searches the destination address field to acquire the destination address. Acquiring the destination address from the communication information of the specific protocol may include receiving the destination address information sent from the first proxy, which was added to the communication date (message) of the communication information of the specific protocol generated by the remote PC.

The second proxy part 31 execute sending processing after the above-described receiving processing. Specifically, the second proxy part 31 sends the communication information of the specific protocol having the destination address obtained through the receiving processing as the destination address (destination IP address of an IP packet) of the communication to the receiving-side end device. In the embodiment as illustrated in FIG. 3, the second proxy part 31 calls a socket API, setting the destination address obtained through the receiving processing in the destination IP address field, to generate a UDP/IP packet containing the communication information of the specific protocol, and the packet is sent from the external communication IF 33*i* to the control network 6. The IP packet is delivered on an Ethernet frame and routed within the control network 6, and received by the receiving-side end device (destination). Accordingly, the receiving-side end device (destination) can receive the communication data from the remote PC. The receiving processing by the second proxy part 31 may include decompression or decryption of the communication information of the specific protocol, and the sending processing may include compression or encryption of the communication information of the specific protocol.

Now, the communication control for the outbound communication will be described.

Figure 4:
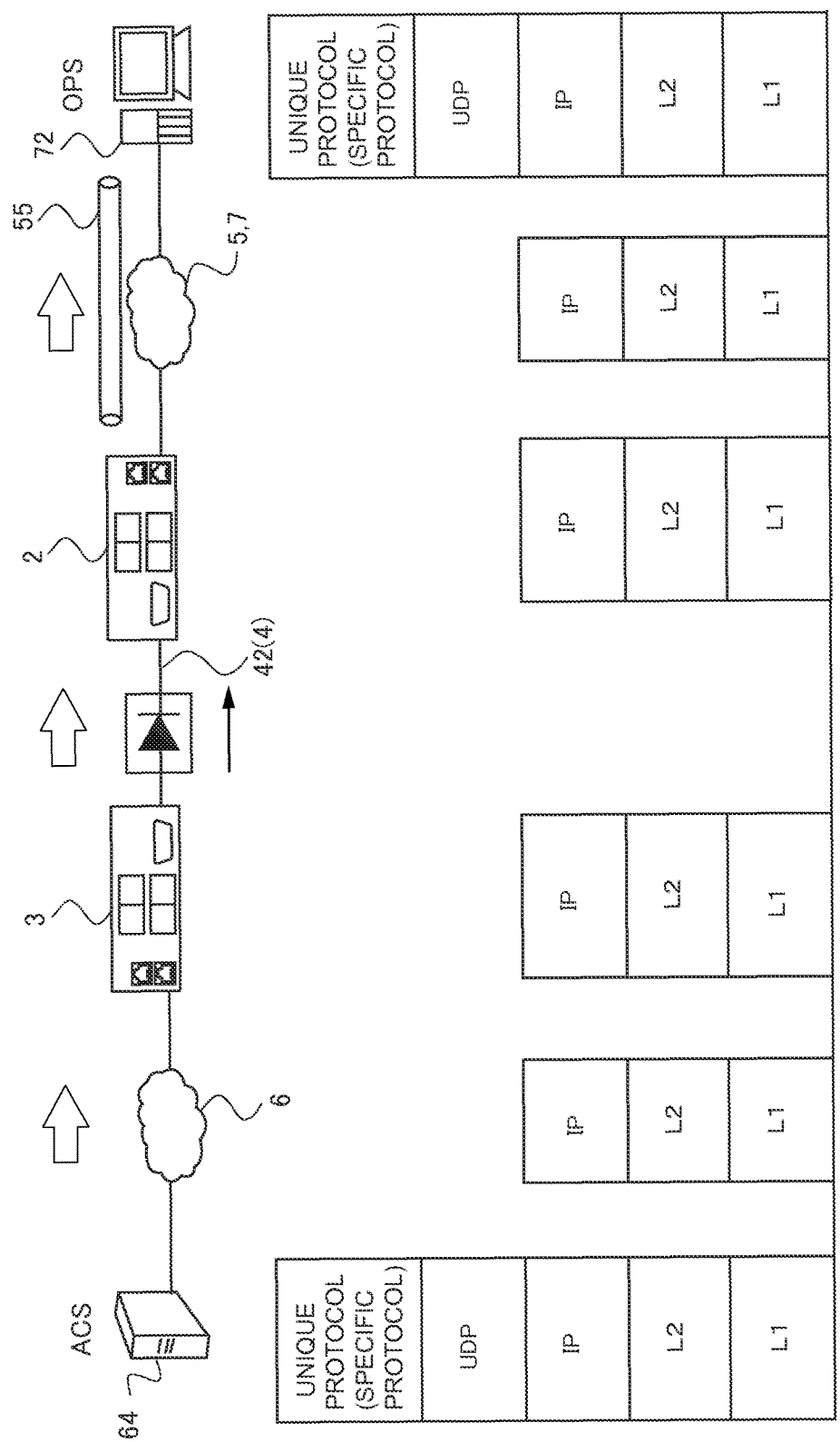
FIG. 4 is a diagram illustrating a protocol stack of outbound communication transmitted through a network according to an embodiment of the present invention.

As shown in FIG. 4, the outbound communication corresponds to data communication performed by using a communication device on the internal network as a source (sending-side end device) and a communication device on the external network communication device as a destination (receiving-side end device). As described above, the security system 1 comprises a simplex communication line for connecting the first gateway device 2 and the second gateway device 3 so as to enable one-way communication from the second gateway device 3 to the first gateway device 2, and an outbound data received by the second gateway device 3 is sent to the first gateway device 2 through the simplex communication line 42 not through the duplex communication line 41. For example, even in a case where the specific protocol (unique protocol) is defined by a specification where a request and a response to the request are processed as a set, like HTTP communication, outbound sending goes through the simplex communication line 42, and inbound sending communication goes through the duplex communication line 41. That is, outbound communication necessarily goes through the simplex communication line 42. It is thereby possible to send e.g. operating information of the plant from the sending-side end device on the internal network to the receiving-side end device (destination) on the external network while cyberattacks or hacking from the external network by using the simplex communication line 42, like a data diode.

FIG. 4 is diagram illustrating a protocol stack of an outbound data to be transmitted through a network according to an embodiment of the present invention. In FIG. 4, an IP packet having a communication information of a specific protocol (unique protocol) set in the data section is sent from the ACS 54 on the control network 6. In the example shown in FIG. 4, the IP packet from the ACS is transmitted on the control network 6 by an Ethernet frame and received by the second gateway device 3 via the external communication IF 33*i*.

When receiving the communication information of the specific protocol through the outbound communication, the second proxy part 31 performs receiving processing and sending processing after the receiving processing. On the other hand, the first proxy part 21 also performs receiving processing and sending processing on the outbound communication received from the second proxy part 31 through the duplex communication line 41. The sending and receiving processing on the outbound communication can be performed in various method as described below.

In some embodiment, as shown in FIG. 4, the second proxy part 31 is configured to, regardless of the type of the application layer protocol of the received transmittal data (IP packet) of the outbound communication, relay (send) the transmittal data, on the basis of the destination address (destination IP address of the IP packet) of the transmittal data. In this case, the first proxy part 21 also sends the IP packet to the destination end device on the basis of the destination address of the received transmittal data of the outbound communication from the second gateway device 3. That is, with regard to the outbound communication, the second proxy part 31 and the first proxy part 21 perform processing only up to the IP layer. It is thereby possible to reduce processing load of the gateway devices. Further, on the control network 6, the communication to be sent via the simplex communication line 42 contains operating data of the plant and is large in amount. Therefore it is possible to obtain a proper communication speed by simplify sending and receiving processing by the second proxy part 31 and the first proxy part 21. Even when the processing is simplified, the outbound communication via the simplex communication line 42 is limited to one-way communication, whereby cyberattacks from the external network via the simplex communication line 42 can be blocked.

In some embodiments, receiving processing and sending processing of the outbound communication by the second proxy part 31 may be carried out in the same manner as the receiving and sending processing of the inbound communication by the first proxy part 21, which is described above, except that IP communication is performed via the simplex communication line 42. In this case, the receiving processing and the sending processing of the outbound communication by the first proxy part 21 is also performed in the same manner as the receiving processing and the sending processing of the inbound communication by the second proxy part 31, which is described above, except that IP communication is performed via the simplex communication line 42. By this configuration, it is possible to limit the outbound communication via the security system 1 to the communication of the specific protocol, whereby it is possible to prevent information leakage from the internal network.

In some embodiments, as shown in FIG. 4, the outbound communication via the security system 1 may be limited to UDP/IP communication. That is, in some embodiments, when the outbound data received from the internal network is based on UDP/IP communication, the second gateway device 3 sends (relays) the out bound data to the first gateway device 2 by using the simplex communication line 42. UDP/IP is a communication protocol of a connectionless type, by which data can be sent without delivery confirmation from the destination device on the external network. Thus it is possible to easily perform one-way communication from the source device on the internal network to the destination device on the external network by using the simplex communication line. In some embodiments, the second gateway device 3 may be configured to relay only UDP/IP packets conveying communication information of the specific protocol. By processing only allowed communication and discarding other packets by the second gateway device 3, it is possible to reduce load of the transferring processing. These filtering process may be performed by the second proxy part 31 or by another program function (filtering part), and the filtering part may transfer the communication data to the second proxy part 31 after the filtering. Further, the UDP/IP packet may be subjected to packet filtering based on the port number, or may be determined on the basis of a predefined list.

Figure 5:
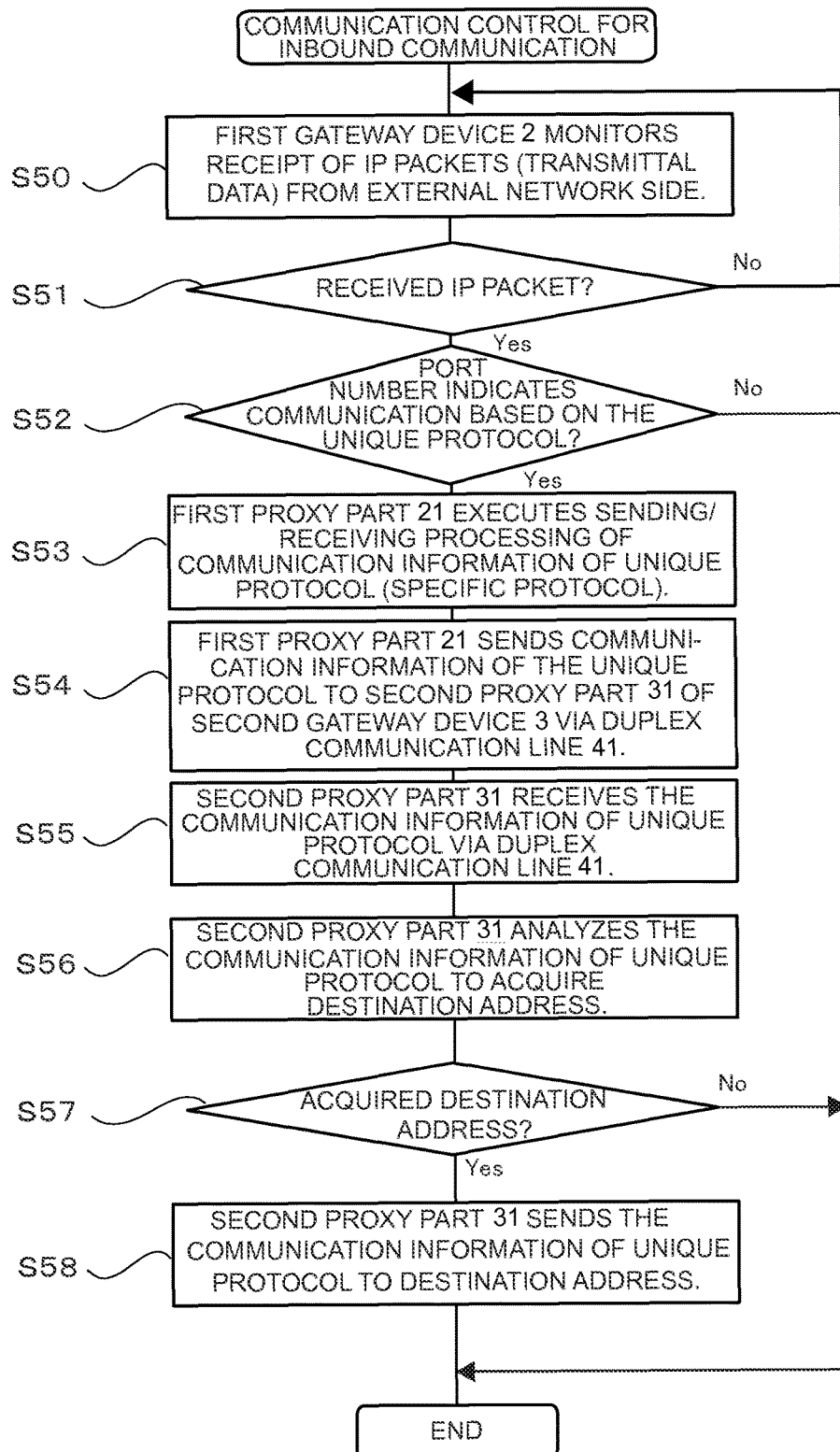
FIG. 5 is a chart showing a flow of communication control for inbound communication of a security system according to an embodiment of the present invention.
Figure 6:
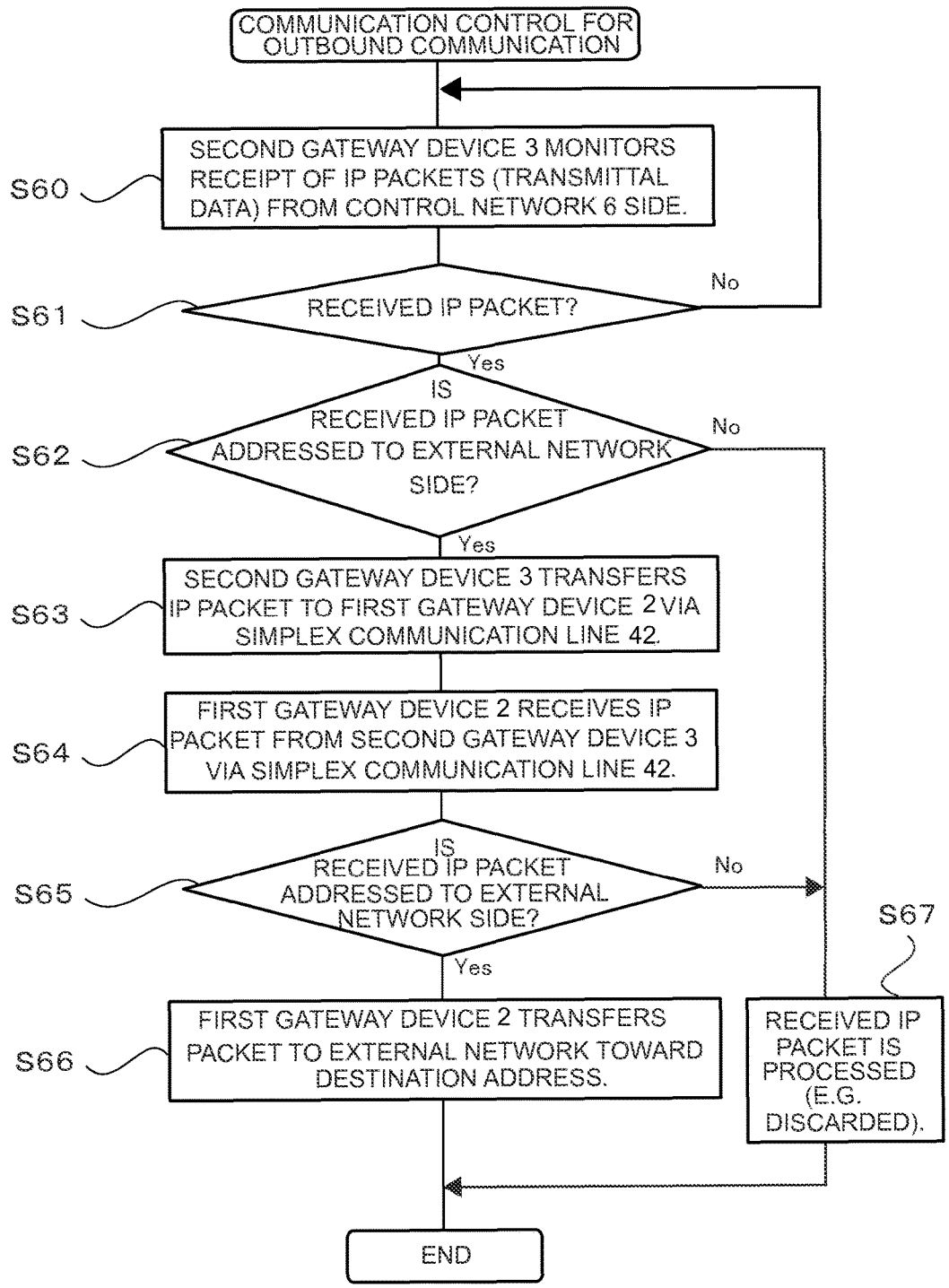
FIG. 6 is a chart showing a flow of communication control for outbound communication of a security system according to an embodiment of the present invention.

Now, a communication control method by the first gateway device 2 and the second gateway device 3 will be specifically described with reference to FIG. 5 and FIG. 6. FIG. 5 is a chart showing a flow of communication control for inbound communication by a security system 1 according to an embodiment of the present invention. FIG. 6 is a chart showing a flow of communication control for outbound communication by a security system 1 according to an embodiment of the present invention. The charts on these figures correspond to the embodiments shown in FIG. 1 to FIG. 4, and the processor of the first gateway device 2 or the second gateway device 3 executes instruction from the proxy part (the first proxy part 21 or the second proxy part 31) to perform the communication control.

In the flow of the communication control as shown in FIG. 5, in step S50, the first gateway device 2 monitors reception of inbound IP packets (transmittal data) from the external network side. If the first gateway device 2 receives an IP packet in step 51, the communication processing part or the first proxy part 21 of the first gateway device 2 performs processing of the IP packet. Specifically, in step S52, whether the IP packet is of a communication based on the specific protocol (unique protocol) is checked by the port number, and if it is not of a communication of the specific protocol, the communication control is ended. For example, the communication control may be ended by discarding the checked received IP packet. If the received IP packet is of a specific protocol (unique protocol) in step S52, the first proxy part 21 performs the above-described sending and receiving processing for the communication information of the specific protocol in step S53.

In step S54, the first proxy part 21 sends the communication information of the specific protocol to the second proxy part 31 of the second gateway device 3 via the duplex communication line 41, and in step S55, the second proxy part 31 receives the communication information of the specific protocol via the duplex communication line 41. In step S56, the second proxy part 31 analyzes the communication information of the specific protocol to acquire the destination address (IP address of the receiving-side end device). If the second proxy part 31 acquires the destination address from the communication information of the specific protocol in step S57, the second proxy part 31 sends the communication information of the specific protocol to the destination address by means of IP communication. On the other hand, if the second proxy part 31 cannot acquire the destination address from the communication information of the specific protocol in step S58, the second proxy part 31 ends the communication control.

FIG. 6 is a chart showing a flow of a communication control of an embodiment where the second gateway device 3 (the second proxy part 31) transfers the received IP packet regardless of the type of the application layer protocol. In step S60 on FIG. 6, the second gateway device 3 (the second proxy part 31) monitors receipt of outbound data (packets) from the internal network side. If the second gateway device 3 receives an IP packet in step S61, the communication processing part or the second proxy part 31 on the platform of the second gateway device 3 performs processing of the IP packet. Specifically, in step S62, the communication processing part or the second proxy part 31 checks the destination of the received IP packet. If the destination of the received IP packet is on the external network side, the communication processing part send the IP packet to the first gateway device 2 via the simplex communication line 42 in step S63. On the other hand, if the destination of the received IP packet is not on the external network side in step S62, in step S67, the communication processing part performs processing of the IP packet and ends the communication control. The processing in step S67 may include, for example, in the case where the IP packet is addressed to the second gateway device 3 itself, processing the IP packet by itself, and in the case where the destination IP address indicates a device within the internal network device, sending the IP packet to the destination within the internal network.

In step S64, the first gateway device 2 receives the IP packet from the second gateway device 3 via the simplex communication line 42. Then, in step S65, the first gateway device 2 checks the destination of the received IP packet. If the destination address indicates a device on the external network side, the first gateway device 2 (the first proxy part 21) sends the IP packet to the external network toward the destination address in step S66. On the other hand, if the destination address does not indicate a device on the external network side in step S65, the received IP packet is processed in step S67. In step 67, the first gateway device 2 may process the IP packet by itself if the IP packet is address to the first gateway device 2 itself, or it may discard the IP packet.

By the above configuration, inbound communication from the external network to the internal network is sent (relayed) from the first gateway device 2 to the second gateway device 3 if the inbound communication is a communication for the communication information of the specific protocol. At this time, the first gateway device 2 receives communication information of the specific protocol delivered by an inbound transmittal data by the first proxy part 21 and then sends (relays) it to the second gateway device 3. That is, the communication information of the specific protocol is a communication data generated by the sending-side end device to exchange a message (e.g. a control command) with the receiving-side end device. Further, the first gateway device 2 terminates the network layer protocol (e.g. IP) for the external network and then sends the communication information of the specific protocol to the internal network. In this way, the sending-side end device on the external network and the receiving-side end device on the internal network are logically separated, and the communication performers which are able to relay the logically separated networks are limited to the first proxy part 21 and the second proxy part 31 which are able to process the specific protocol, whereby communication other than that based on the specific protocol cannot enter the inside. Thus it is possible to block improper access such as attacks or hacking from the external network to the internal network, thereby to protect the internal network.

Further, the second proxy part 31 of the second gateway device 3 acquires the destination address (e.g. the destination IP address) of the receiving-side end device on the internal network on the basis of the communication information of the specific protocol received from the first gateway device, whereby it is possible to send the communication information of the specific protocol to the receiving-side end device. That is, communication other than that based on the specific protocol cannot acquire the destination address of the receiving-side end device, and such communication will not be sent (relayed) to the receiving-side end device on the internal network (control network 6). It is thereby possible to improve protection of the internal network by the second gateway device 3. As seen from the above, the security system 1 protects the internal network by the two-stage system including the first gateway device 2 and the second gateway device 3, and it is possible to protect the internal network firmly by the security system 1. Further, the above communication control by means of the first gateway device 2 (the first proxy part 21) and the second gateway device 3 (the second proxy part 31) does not have influence on the communication processing (generating IP packets, employment of a specific communication interface) for the sending-side end device and the receiving-side end device, whereby it is possible to build a communication path which is secure and of a high degree of freedom.

Further, an IP network is formed by the internal network and the external network, and this IP network is logically divided by the first gateway device and the second gateway device. Thus, except for communication based on the specific protocol (unique protocol), IP communication from the external network e.g. the Internet is blocked from the internal network, whereby it is possible to protect the internal network from e.g. cyberattacks from e.g. the Internet based on IP.

In some embodiments, as shown in FIG. 1, the first gateway device 2 is connected to the external network via the first firewall 14a, and the second gateway device 3 is connected to the internal network via the second firewall 14b. In the embodiment as shown by the FIG. 1, the first firewall 14a is provided between the first gateway device 2 and the Internet 5, and the second firewall 14b is provided between the second gateway device 3 and the control network 6. By filtering a packet by means of these firewalls, only predetermined communication is allowed. The filtering of the communication (IP packets) is performed on the basis of a list (access list) on which the filtering conditions are defined. For example, the filtering conditions may include a condition that only the above-described specific protocol (unique) protocol is allowed to go through the firewall. Or, the filtering conditions may include a condition that UDP communication is allowed to go through the firewall. When filtering is performed by means of the first firewall 14a or the second firewall 14b as described above, filtering by the first gateway device 2 or by the second gateway device 3 may be omitted.

By the above configuration, it is possible to block cyber-attacks from the external network to the internal network while the predetermined communication is allowed by means of the first firewall 14a and the second firewall 14b, and it is possible to protect the internal network firmly. Further, it is possible to reduce processing load of the first gateway device and the second gateway device.

It should be understood, however, that the present invention is by no means limited to the above-described embodiments and various and modifications or combination thereof may be implemented within a scope that does not depart from the present invention.

For example, in the embodiment as shown in FIG. 1, the remote PC (e.g. the OPS 72) is connected to the teleport network 7. In some embodiments, it may be that the remote PC is not connected to the teleport network 7 and a VPN connection is established between the remote PC and the first firewall 14a by means of a remote access VPN technology. Further, a global IP address may be assigned to e.g. the remote PC.

The remote PC may send a packet to the first gateway device 2 as the destination end device. In this case, the first gateway device 2 and the second gateway device 3 determine the transferring destination (e.g. the control device 63 on the control network 6) on the basis of the destination address contained in the communication information of the specific protocol.

In the embodiment as shown in FIG. 1, connection by the duplex communication line 41 and the connection by the simplex communication line 42 are wired connections. In some embodiments, at least one of the communication lines 4 may be composed by a wireless connection. In the embodiment as shown in FIG. 1, the duplex communication line 41 is based on RS-232C; however, the duplex communication line 41 is not limited thereto and another standard communication protocol may be employed as long as it enables one-to-one connection. Further, in the embodiment as shown in FIG. 1, the one-way communication by the simplex communication line 42 is formed by connecting physical ports; however, it is not limited thereto, and it may be that cabling of e.g. LAN cables is changed, or a communication cable from the first gateway device 2 to the second gateway device 3 is removed or insulated, for example. It should be understood that these examples are also included in 'connecting physical ports'. Further, the one-way communication is physically implemented by the simplex communication line 42; however, in some embodiments, the one-way communication may be logically implemented (on L2 or upper communication layer), and the one-way communication may be implemented by software. Or, the one-way communication may be implemented physically and logically.

In the embodiment as shown in FIG. 3 and FIG. 4, UDP/IP communication is employed; however, in some embodiments, TCP/IP communication may be employed.

REFERENCE SIGNS LIST

1 Security system
14a First firewall
14b Second firewall
15 VPN device
2 First gateway device
21 First proxy part
23 External communication interface
3 Second gateway device
31 Second proxy part
33 External communication interface
4 Communication line
41 Duplex communication line
42 Simplex communication line
5 Internet (External network)
55 VPN tunnel
6 Control network (Internal network)
63 Control device
64 Accessory station (ACS)
65 Operator station (OPS)
7 Teleport network (External network)
72 Operator station (OPS)
74 Firewall
75 VPN device

The invention claimed is:

1. A security system comprising:
    a first gateway device configured to be connected to an external network;
    a second gateway device configured to be connected to an internal network and to the first gateway device;
    a duplex communication line for connecting the first gateway device and the second gateway device so as to enable two-way communication between the first gateway device and the second gateway device; and
    a simplex communication line for connecting the first gateway device and the second gateway device so as to enable one-way communication from the second gateway device to the first gateway device,
    wherein the first gateway device has a first proxy part configured to process a specific protocol of an application layer,
    wherein the second gateway device has a second proxy part configured to process the specific protocol,
    wherein the first proxy part is configured, when the first gateway device receives an inbound data from the external network to the internal network, to receive a communication information of the specific protocol conveyed by the inbound data and to send the communication information of the specific protocol to the second gateway device through the duplex communication line if the inbound data is of the specific protocol, and not to send the inbound data to the second gateway device if the inbound data is not of the specific protocol,
    wherein the second proxy part is configured, when the second gateway device receives the communication information of the specific protocol from the first proxy part through the duplex communication line, to acquire a destination address for communication in the internal network from the communication information of the specific protocol and to send the communication information of the specific protocol to the destination address, and
    wherein when the second gateway device receives an outbound data from the internal network to the external network, the outbound data is sent to the first gateway device through the simplex communication line and not through the duplex communication line.

2. The security system according to claim 1, wherein the simplex communication line includes an optical fiber cable for connecting a physical sending port of the second gateway device and a physical receiving port of the first gateway device.

3. The security system according to claim 1, wherein the security system is configured so that on the duplex communication line, communication by means of a non-routable protocol is performed.

4. The security system according to claim 1, wherein each of the external network and the internal network includes IP network.

5. The security system according to claim 4, wherein the first gateway device is configured to identify the communication information of the specific protocol by a port number.

6. The security system according to claim 5, wherein the second gateway device is configured to send the outbound data to the first gateway device by using the simplex communication line when the outbound data received from the internal network is of a UDP/IP communication.

7. The security system according to claim 1, wherein the specific protocol is a unique protocol which is not standardized.

8. The security system according to claim 3, wherein the duplex communication line includes a serial communication including RS-232C.

9. The security system according to claim 1,
    wherein the first gateway device is connected to the external network through a first firewall, and
    wherein the second gateway device is connected to the internal network through a second firewall.

10. A communication control method executed by a security system including: a first gateway device configured to be connected to an external network; a second gateway device configured to be connected to an internal network and to the first gateway device; a duplex communication line for connecting the first gateway device and the second gateway to each other; and a simplex communication line for connecting the first gateway device and the second gateway device so as to enable one-way communication from the second gateway device to the first gateway device, the communication control method comprising:
    an inbound data receiving step of receiving an inbound data from the external network to the internal network by the first gateway device;
    a first inbound communication processing step of, by means of the first gateway device, checking an application layer protocol of the inbound data, and sending the inbound data to the second gateway device by using the duplex communication line if the application layer protocol is a specific protocol, and not sending the inbound data to the second gateway device if the application layer protocol is not the specific protocol;
    a second inbound communication processing step of, if the inbound data received from the first gateway device includes a communication information of the specific protocol, by means of the second gateway device, acquiring a destination address for communication in the internal network on the basis of information of the specific protocol and sending the inbound data to the destination address; and
    an outbound communication processing step of, when the second gateway device receives an outbound data from the internal network to the external network, sending the outbound data to the first gateway device through the simplex communication line and not through the duplex communication line.

11. The communication control method according to claim 10, wherein the simplex communication line includes an optical fiber cable for connecting a physical sending port of the second gateway device and a physical receiving port of the first gateway device.

12. The communication control method according to claim 10, wherein in the duplex communication line, communication by means of a non-routable protocol is performed.

13. The communication control method according to claim 10, wherein each of the external network and the internal network includes IP network.

14. The communication control method according to claim 13, wherein the first gateway device is configured to identify the communication information of the specific protocol by a port number.

15. The communication control method according to claim 14, wherein the outbound communication processing step includes an outbound communication filtering step of permitting sending of the outbound data through the simplex communication line when the outbound data received from the internal network is of a UDP/IP communication.

16. The communication control method according to claim 10, wherein the specific protocol is a unique protocol which is not standardized.

17. The communication control method according to claim 12, wherein the duplex communication line includes a serial communication including RS-232C.

18. The communication control method according to claim 10,
- wherein the first gateway device is connected to the external network through a first firewall, and
- wherein the second gateway device is connected to the internal network through a second firewall.

\* \* \* \* \*